US008079079B2

(12) United States Patent
Zhang et al.

(10) Patent No.: US 8,079,079 B2
(45) Date of Patent: Dec. 13, 2011

(54) MULTIMODAL AUTHENTICATION

(75) Inventors: Zhengyou Zhang, Bellevue, WA (US); David W. Williams, Woodinville, WA (US); Yuan Kong, Kirkland, WA (US); Zicheng Liu, Bellevue, WA (US); David Kurlander, Seattle, WA (US); Mike Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1443 days.

(21) Appl. No.: 11/171,145

(22) Filed: Jun. 29, 2005

(65) Prior Publication Data

US 2007/0005988 A1 Jan. 4, 2007

(51) Int. Cl.
G06F 7/04 (2006.01)
G06F 12/00 (2006.01)
G06F 12/14 (2006.01)
G06F 13/00 (2006.01)
G06F 17/30 (2006.01)
G11C 7/00 (2006.01)

(52) U.S. Cl. .......................................... 726/19; 706/48

(58) Field of Classification Search ........................ None
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,181,803 B1 * | 1/2001 | Davis ............................ | 382/115 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,609,198 B1 * | 8/2003 | Wood et al. ................... | 713/155 |
| 6,615,264 B1 * | 9/2003 | Stoltz et al. ................... | 709/227 |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2 | 1/2005 | Robarts et al. | |
| 7,124,300 B1 * | 10/2006 | Lemke .......................... | 713/186 |

(Continued)

FOREIGN PATENT DOCUMENTS

WO 9800787 1/1998

OTHER PUBLICATIONS

Andy Harter, et al., A Distributed Location System for the Active Office, IEEE Network, 1994, pp. 62-70.

(Continued)

*Primary Examiner* — Kaveh Abrishamkar
*Assistant Examiner* — Nadia Khoshnoodi
(74) *Attorney, Agent, or Firm* — Lee & Hayes, PLLC

(57) ABSTRACT

A multimodal system that employs a plurality of sensing modalities which can be processed concurrently to increase confidence in connection with authentication. The multimodal system and/or set of various devices can provide several points of information entry in connection with authentication. Authentication can be improved, for example, by combining face recognition, biometrics, speech recognition, handwriting recognition, gait recognition, retina scan, thumb/hand prints, or subsets thereof. Additionally, portable multimodal devices (e.g., a smartphone) can be used as credit cards, and authentication in connection with such use can mitigate unauthorized transactions.

20 Claims, 14 Drawing Sheets

U.S. PATENT DOCUMENTS

| | | | | |
|---|---|---|---|---|
| 7,257,557 | B2* | 8/2007 | Hulick | 705/50 |
| 7,389,208 | B1* | 6/2008 | Solinsky | 703/2 |
| 2001/0040590 | A1 | 11/2001 | Abbott et al. | |
| 2001/0040591 | A1 | 11/2001 | Abbott et al. | |
| 2001/0043231 | A1 | 11/2001 | Abbott et al. | |
| 2001/0043232 | A1 | 11/2001 | Abbott et al. | |
| 2002/0032689 | A1 | 3/2002 | Abbott, III et al. | |
| 2002/0044152 | A1 | 4/2002 | Abbott, III et al. | |
| 2002/0052930 | A1 | 5/2002 | Abbott et al. | |
| 2002/0052963 | A1 | 5/2002 | Abbott et al. | |
| 2002/0054130 | A1 | 5/2002 | Abbott, III et al. | |
| 2002/0054174 | A1 | 5/2002 | Abbott et al. | |
| 2002/0073320 | A1* | 6/2002 | Rinkevich et al. | 713/183 |
| 2002/0078204 | A1 | 6/2002 | Newell et al. | |
| 2002/0080155 | A1 | 6/2002 | Abbott et al. | |
| 2002/0080156 | A1 | 6/2002 | Abbott et al. | |
| 2002/0083025 | A1 | 6/2002 | Robarts et al. | |
| 2002/0083158 | A1 | 6/2002 | Abbott et al. | |
| 2002/0087525 | A1 | 7/2002 | Abbott et al. | |
| 2002/0099817 | A1 | 7/2002 | Abbott et al. | |
| 2003/0046401 | A1 | 3/2003 | Abbott et al. | |
| 2003/0084289 | A1* | 5/2003 | Watanabe | 713/168 |
| 2003/0115473 | A1* | 6/2003 | Sugimura et al. | 713/186 |
| 2003/0154476 | A1 | 8/2003 | Abbott, III et al. | |
| 2003/0163710 | A1* | 8/2003 | Ortiz et al. | 713/186 |
| 2003/0225703 | A1* | 12/2003 | Angel | 705/64 |
| 2003/0233569 | A1* | 12/2003 | Geib et al. | 713/200 |
| 2004/0049684 | A1* | 3/2004 | Nomura et al. | 713/182 |
| 2005/0022005 | A1* | 1/2005 | McKeeth | 713/200 |
| 2005/0034078 | A1 | 2/2005 | Abbott et al. | |
| 2005/0063567 | A1* | 3/2005 | Saitoh et al. | 382/115 |
| 2005/0229007 | A1* | 10/2005 | Bolle et al. | 713/186 |
| 2005/0268107 | A1* | 12/2005 | Harris et al. | 713/182 |
| 2007/0205876 | A1* | 9/2007 | Nguyen | 340/426.12 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, in Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, in Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, in the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of the First International Conference on the Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of the First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

MULTIMODAL AUTHENTICATION

BACKGROUND

The advent of global communications networks such as the Internet has served as a catalyst for the convergence of computing power and services in portable computing devices. For example, in the recent past, portable devices such as cellular telephones and personal data assistants (PDAs) have employed separate functionality for voice communications and personal information storage, respectively. Today, these functionalities can be found in a single portable device, for example, a cell phone that employs multimodal functionality via increased computing power in hardware and software. Such devices are more commonly referred to as "smartphones."

Oftentimes, these smartphones are further equipped with built-in digital image capture devices (e.g., cameras) for taking photos or short video clips, and microphones for receiving voice input, together with the computing functionalities of the PDA. The hardware and software features available in these smartphones and similar technologically capable devices provide developers the capability and flexibility to build applications through a versatile platform. Similarly, the built-in digital image capture devices are capable of generating video graphics array (VGA) quality pictures having 640×480 pixel resolution or higher. Many smartphones are capable of taking pictures on the order of one mega-pixel resolution and higher.

Given the advances in storage and computing power of smartphones, in particular, and portable wireless devices, generally, such devices can also serve as electronic organizers for managing and organizing a variety of PIM (personal information manager) data. The electronic organizer enables a user to store personal data in the smartphone for any purpose and to retrieve the data as desired, for authentication to a network, access to personal website information such as bank accounts and credit card accounts, and so on.

With the technological advances in handheld and portable devices, there is an ongoing and increasing need to maximize the benefit of these continually emerging technologies. For example, with so much personal information being stored in the smartphone, for example, and that exposure of such information can allow widespread access to any number of systems by unscrupulous individuals, it is becoming increasingly important to ensure that only the true owner of the device, can access the device. Additionally, once the true owner has accessed the device, there needs to be a mechanism whereby only the true owner will be allowed to access the associated network(s). Such access control can be managed through authentication.

Authentication is the process of determining whether someone or something is, in fact, who or what it is declared to be. In private and public computer networks (including the Internet), authentication is commonly performed through the use of a logon process that can include a username and password. Traditionally, knowledge of the password is assumed to guarantee that the user is authentic. In practice, each user registers using an assigned or self-declared password. On each subsequent use, the user must use the previously declared password. One major flaw in this system is that passwords can often be forgotten, or more seriously, stolen and/or accidentally revealed. Such exposure can have a major impact on personal financial accounts and transactions, and even promote a more recent and rapidly increasing crime of identity theft. For this reason, Internet businesses and many other transactions now require more stringent authentication processes such as digital certificates. However, the criminal element will continue to seek ways of circumventing such authentication processes.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation disclosed and claimed herein, in one aspect thereof, employs a plurality of sensing modalities that can be concurrently processed to increase confidence in connection with authentication. A multimodal device and/or set of various devices can provide several points of information entry in connection with authentication. Authentication can be improved, for example, by combining face recognition, biometrics, speech recognition, handwriting recognition, gait recognition, retina scan, thumb/hand prints, or subsets thereof. Additionally, portable multimodal devices (e.g., a smartphone) can be used as credit cards, and authentication in connection with such use can mitigate unauthorized transactions.

In another aspect, authentication is provided of a user of a portable wireless device, to the portable wireless device.

In yet another aspect thereof, authentication is initiated by a remote system when the portable wireless device is brought into communication with the remote system.

In still another aspect of the subject innovation, the authentication process automatically adjusts the authentication process according to the context in which authentication is to occur.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
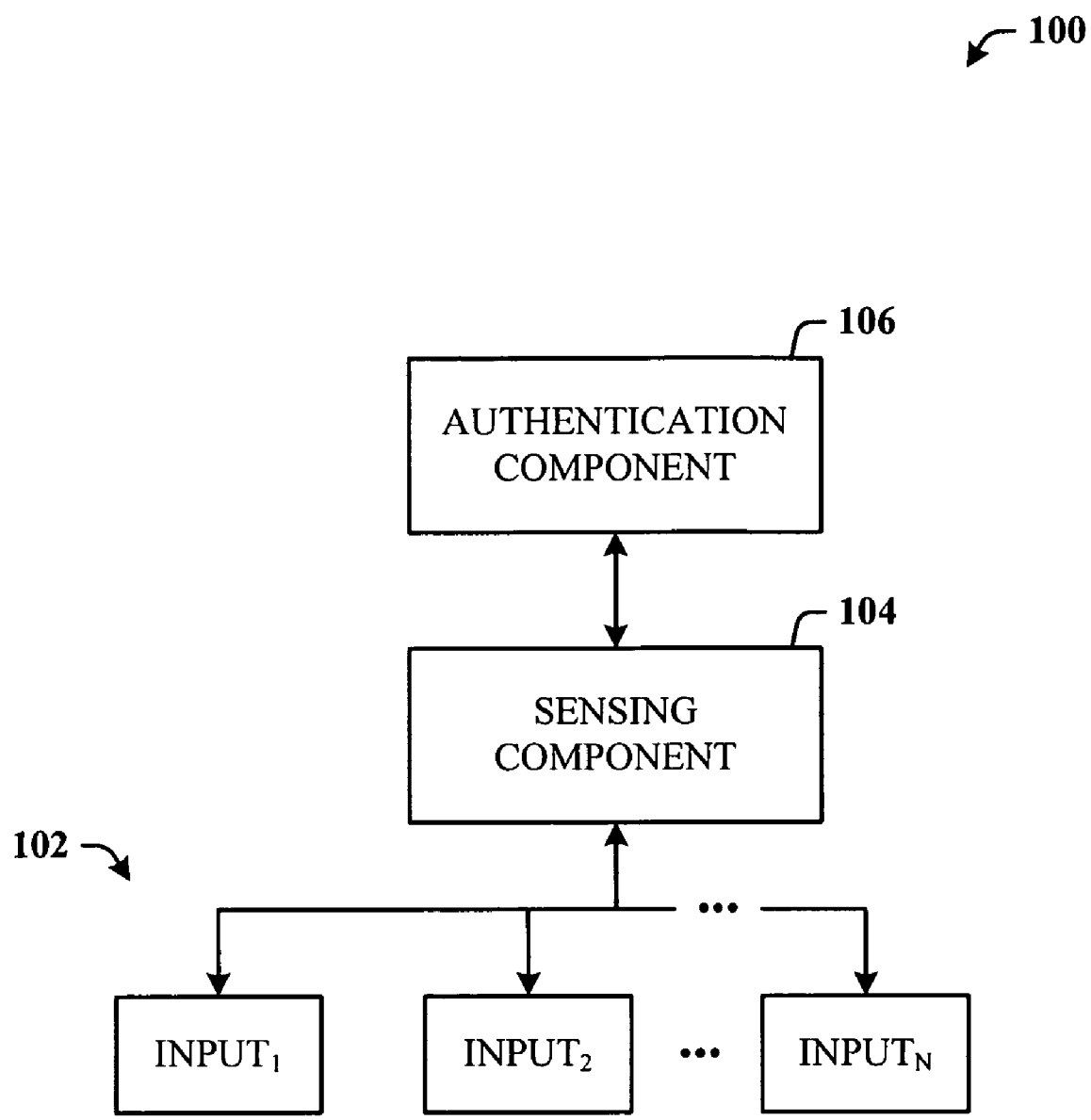
FIG. 1 illustrates a system that employs multimodal authentication in accordance with the subject innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the terms to "infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that employs multimodal authentication in accordance with the subject innovation. A plurality of sensed inputs 102 (denoted INPUT$_1$, INPUT$_2$, ..., INPUT$_N$, where N is an integer), also referred to herein as authenticating inputs, can be employed to increase confidence associated with the authentication process. Authentication can be improved, for example, by processing data and/or combined sets of data received from one or more of the sensed inputs 102 substantially concurrently. Such inputs can include, by example, but not by limitation, data associated with face recognition, biometrics, speech recognition, handwriting recognition, gait recognition, retina scan processing, fingerprinting and/or handprinting, or any combination thereof.

In support thereof, the system 100 further includes a sensing component 104 that interfaces to the one or more sensed inputs 102 to receive at least input data therefrom, and process the input data for communication to an authentication component 106. The authentication component 106 receives the input data from the sensing component 104 in a format that allows further authentication processing in order to determine authentication of the user.

In one implementation, the system 100 can be employed in a multimodal portable wireless device that includes one or more of the sensed inputs 102. Such a portable multimodal device can be used as a "credit card", such that the enhanced security authentication features in connection with such use can mitigate unauthorized transactions.

In another implementation, the multimodal device can operate in conjunction with a set of various external systems which provide several points of information entry that can be employed in connection with authentication. For example, the portable device need not include more reliable input subsystems such as hand or finger printing recognition. Such more complex input systems can be configured as separate and external systems that can be employed in cooperation with input systems of the multimodal device at a predetermined authentication location during the authentication process such that input systems provided as part of the multimodal device and the external input systems can provide data that facilitates the user and/or device authentication process.

Figure 2:
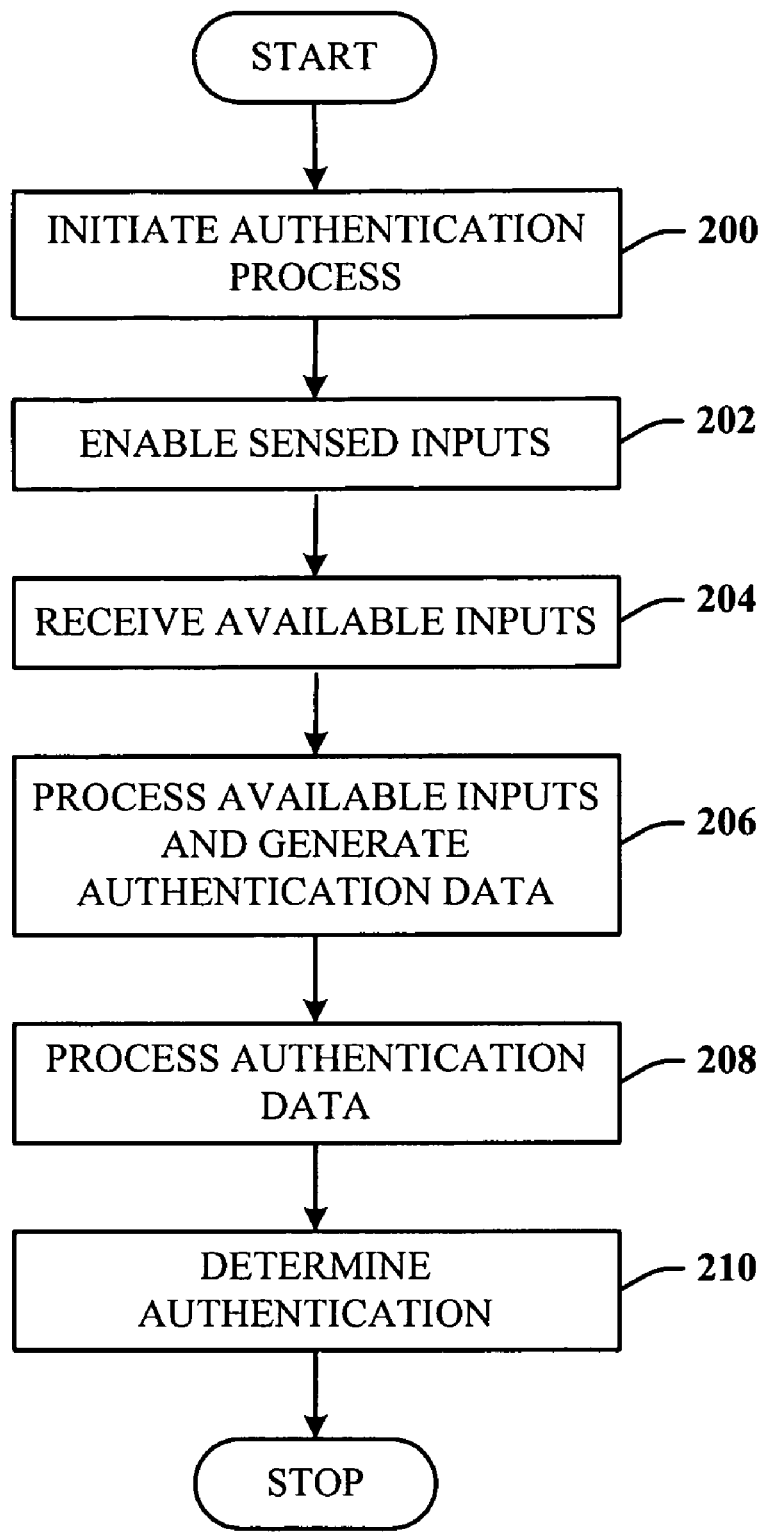
FIG. 2 illustrates a methodology of multimodal authentication processing in accordance with the subject innovation.

FIG. 2 illustrates a methodology of multimodal authentication processing in accordance with the subject innovation. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, the authentication process is initiated. This can occur manually, automatically, or a combination of manually and automatically, by the user moving the portable device into communications range of a network wireless access point, for example, or in a wired regime, by connecting the device to a network which then initiates the authentication process. However, it is to be appreciated that authentication can also occur in a peer-to-peer fashion simply between two multimodal devices, or in an ad hoc manner of more than two peer devices.

At 202, sensed inputs are enabled. This can be a power management phase, for example, such that the one or more onboard sensing subsystems are only enabled when the authentication process is initiated. Alternatively, selected ones (e.g., low power sensing subsystems) of the input subsystems are selected for continuous or periodic operation, while the more power intensive subsystems are enabled only when deemed necessary by the user and/or particular authentication operation. For example, peer-to-peer authentication can be configured to enable a biometric authentication process, whereas by contrast, access to a bank safe deposit box can require voice recognition, handwriting recognition, and a retinal scan.

At 204, of the input subsystems that are enabled, the input data is received from each. At 206, the input data is processed and authentication data generated. At 208, the authentication data is then processed against a corresponding set of predetermined user input data stored for that purpose. At 210, the authentication process completes, the user and/or device is either authenticated or prohibited from further access. For example, the user is denied access to the device and/or the device is denied access to the remote system.

Figure 3:
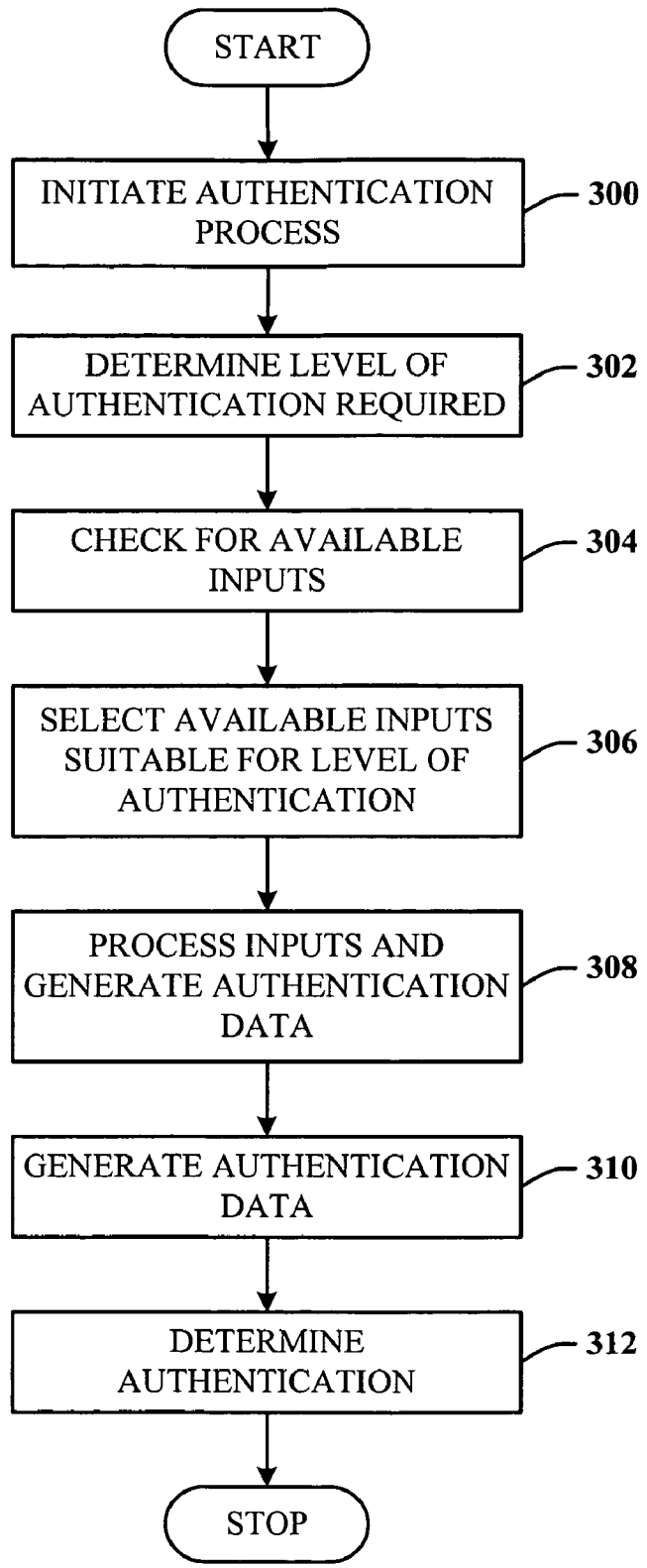
FIG. 3 illustrates a methodology of selecting inputs based on a level of authentication desired.

In accordance with another aspect, FIG. 3 illustrates a methodology of selecting inputs based on a level of authentication desired. At 300, the authentication process is initiated. At 302, a level of authentication is determined. As indicated supra, this can depend in part upon the access desired. For example, access to a bank deposit box can required a higher level of authentication, whereas a peer-to-peer application can require a lower level of authentication.

At 304, a check is made to determine the number and types of available inputs for authentication processing. At 306, of the available inputs, one or more are selected for the level of authentication desired. For example, a higher level of authentication can require a greater number of sensed inputs for the authentication process, whereas a lower level of authentication can require a fewer number of inputs to be processed. Additionally, or alternatively, the higher level of authentication can require that sensing subsystem inputs that are more determinative (or reliable) be employed over those sensing subsystems that are less accurate. At 308, the inputs are processed and the authentication data generated. At 310, authentication data is processed into the authentication results. At 312, authentication is determined, and based thereon, access is allowed or denied.

In another implementation, if the user/device fails the level of authentication, access can default to a minimum or lower level of access and/or services. For example, where the user seeks access to edit account information, authentication failure could default to read-only access, and to a more limited amount of account information.

Figure 4:
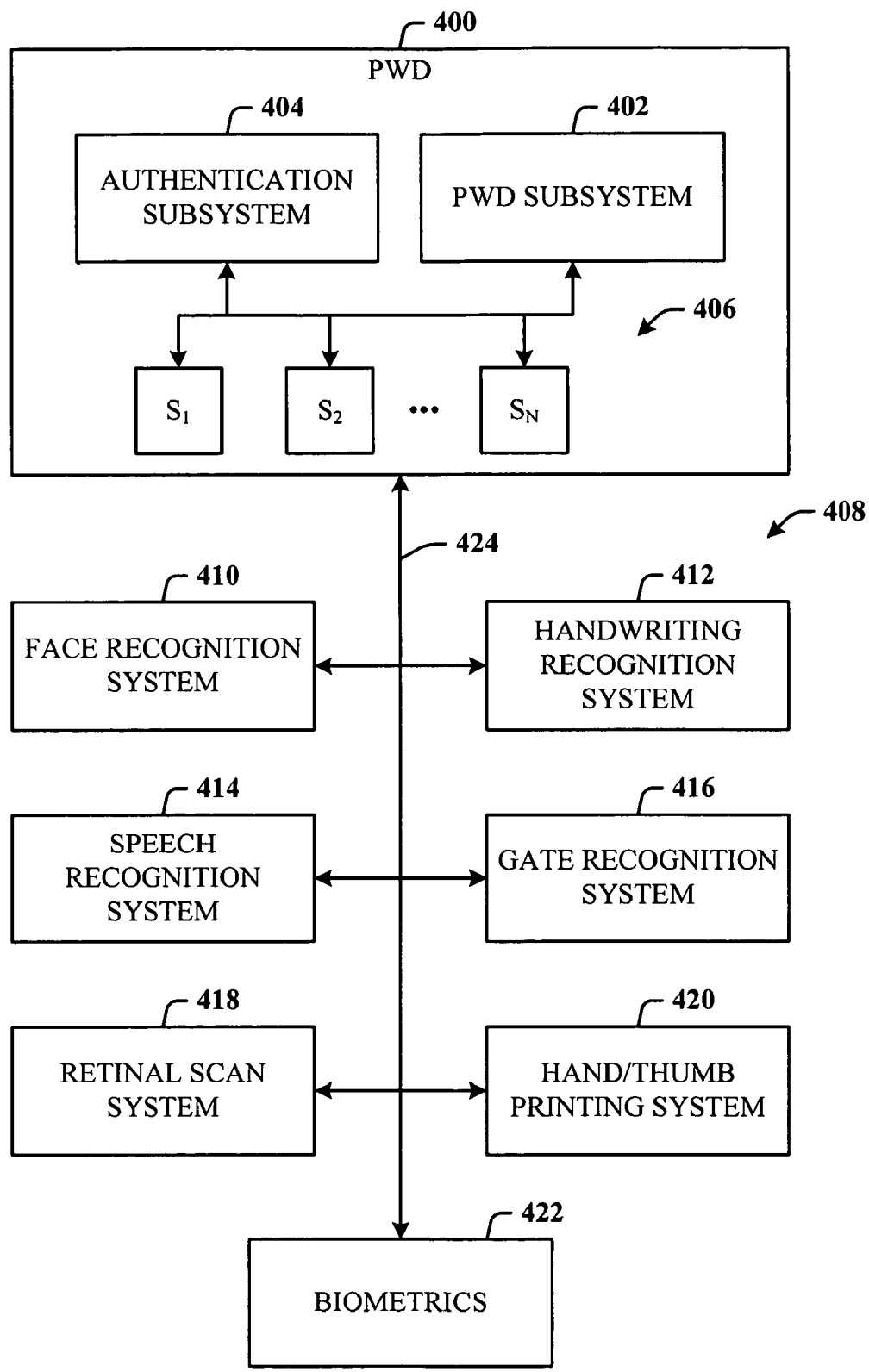
FIG. 4 illustrates a general diagram of a portable wireless device (PWD) that employs multimodal authentication capability in accordance with another aspect of the innovation.

FIG. 4 illustrates a general diagram of a portable wireless device (PWD) 400 that employs multimodal authentication capability in accordance with another aspect of the innovation. The device 400 includes a PWD subsystem 402 that facilitates operation and functionality for the desired purpose(s) thereof. For example, if the device 400 is a cellular telephone, the subsystem 402 can include all of the data storage (and capture capability for a phone camera), user interface, display, wireless communications, registration information, and processing system. If the device 400 is similar to a PDA (personal digital assistant), other user interaction capabilities can be provided, as well as address books, contact information, etc.

The device 400 also includes an authentication subsystem 404 that facilitates the generation of authentication data that can be utilized to complete an authentication process internally, and/or an external system. In one implementation, the authentication subsystem 404 interfaces to one or more onboard sensors 406 (denoted $S_1, S_2, \ldots, S_N$, where N is an integer) to receive sensor data. Authentication can then occur via only the onboard sensors 406. In another aspect thereof, a number of different external systems 408 are employed. The external systems 408 can include many different user identification systems. For example, and not by limitation, the external systems can include a face recognition system 410, a handwriting recognition system 412, a speech recognition system 414, a gait recognition system 416, a retinal scan system 418, hand/thumb printing system 420, and a biometrics system 422, any or all of which can communicate with the PWD 400 via a wired and/or wireless system 424. Additionally, any or all of the external systems 408 can be employed in combination with any or all of the onboard sensors 406 in the authentication process.

Figure 5:
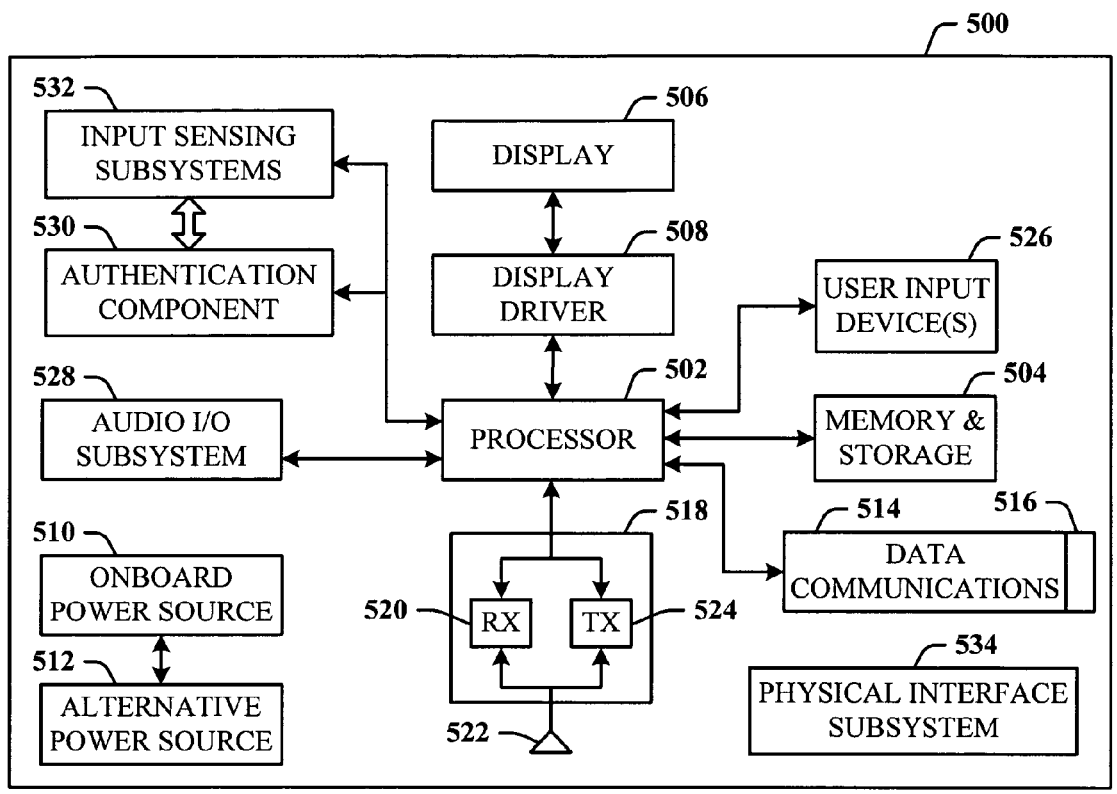
FIG. 5 illustrates a schematic block diagram of a portable wireless multimodal device according to one aspect of the subject innovation.

FIG. 5 illustrates a schematic block diagram of a portable wireless multimodal device 500 according to one aspect of the subject innovation. The device 500 includes a processor 502 that interfaces to one or more internal components for control and processing of data and instructions. The processor 502 can be programmed to control and operate the various components within the device 500 in order to carry out the various functions described herein. The processor 502 can be any of a plurality of suitable processors (e.g., a DSP-digital signal processor), and can be a multiprocessor subsystem.

A memory and storage component 504 interfaces to the processor 502 and serves to store program code, and also serves as a storage means for information such as data, applications, services, metadata, device states, and the like. The memory and storage component 504 can include non-volatile memory suitably adapted to store at least a complete set of the sensed data that is acquired from the sensing subsystem and/or sensors. Thus, the memory 504 can include RAM or flash memory for high-speed access by the processor 502 and/or a mass storage memory, e.g., a micro drive capable of storing gigabytes of data that comprises text, images, audio, and/or video content. According to one aspect, the memory 504 has sufficient storage capacity to store multiple sets of information relating to disparate services, and the processor 502 can include a program that facilitates alternating or cycling between various sets of information corresponding to the disparate services.

A display 506 can be coupled to the processor 502 via a display driver subsystem 508. The display 506 can be a color liquid crystal display (LCD), plasma display, touch screen display, or the like. The display 506 functions to present data, graphics, or other information content. Additionally, the display 506 can present a variety of functions that are user selectable and that provide control and configuration of the device 500. In a touch screen example, the display 506 can display touch selectable icons that facilitate user interaction for control and/or configuration.

Power can be provided to the processor 502 and other onboard components forming the device 500 by an onboard power system 510 (e.g., a battery pack or fuel cell). In the event that the power system 510 fails or becomes disconnected from the device 500, an alternative power source 512 can be employed to provide power to the processor 502 and other components (e.g., sensors, image capture device, . . . ) and to charge the onboard power system 510, if a chargeable technology. For example, the alternative power source 512 can facilitate interface to an external a grid connection via a power converter. The processor 502 can be configured to provide power management services to, for example, induce a sleep mode that reduces the current draw, or to initiate an orderly shutdown of the device 500 upon detection of an anticipated power failure.

The device 500 includes a data communication subsystem 514 having a data communication port 516, which port 516 is employed to interface the device 500 to a remote computing system, server, service, or the like. The port 516 can include one or more serial interfaces such as a Universal Serial Bus (USB) and/or IEEE 1394 that provide serial communications capabilities. Other technologies can also be included, but are not limited to, for example, infrared communications utilizing an infrared communications port, and wireless packet communications (e.g., Bluetooth™, Wi-Fi, and Wi-Max). If a smartphone, the data communications subsystem 514 can include SIM (subscriber identity module) data and the information necessary for cellular registration and network communications.

The device 500 can also include a radio frequency (RF) transceiver section 518 in operative communication with the processor 502. The RF section 518 includes an RF receiver 520, which receives RF signals from a remote device or system via an antenna 522 and can demodulate the signal to obtain digital information modulated therein. The RF section 518 also includes an RF transmitter 524 for transmitting information (e.g., data, service(s)) to a remote device or system, for example, in response to manual user input via a user input device 526 (e.g., a keypad), or automatically in response to detection of entering and/or anticipation of leaving a communication range or other predetermined and programmed criteria.

The device 500 can also include an audio I/O subsystem 528 that is controlled by the processor 502 and processes voice input from a microphone or similar audio input device (not shown). The audio subsystem 528 also facilitates the presentation of audio output signals via a speaker or similar audio output device (not shown).

The device 500 can also include an authentication component 530 that facilitates authentication of a user to the device itself and/or to a remote system. The authentication component 530 interfaces to the processor 502, and can also interface directly to an input sensing subsystems block 532 which can include one or more of the recognition systems (e.g., speech, eye, face, . . . ) and biometric system described in FIG. 4. It is to be appreciated that either/both of the authentication component 530 or/and the input sensing subsystems 532 can include individual processors to offload processing from the central processor 502. The device 500 can also include a physical interface subsystem 534 that allows direct physical connection to another system (e.g., via a connector), rather than by wireless communications or cabled communications therebetween.

Figure 6:
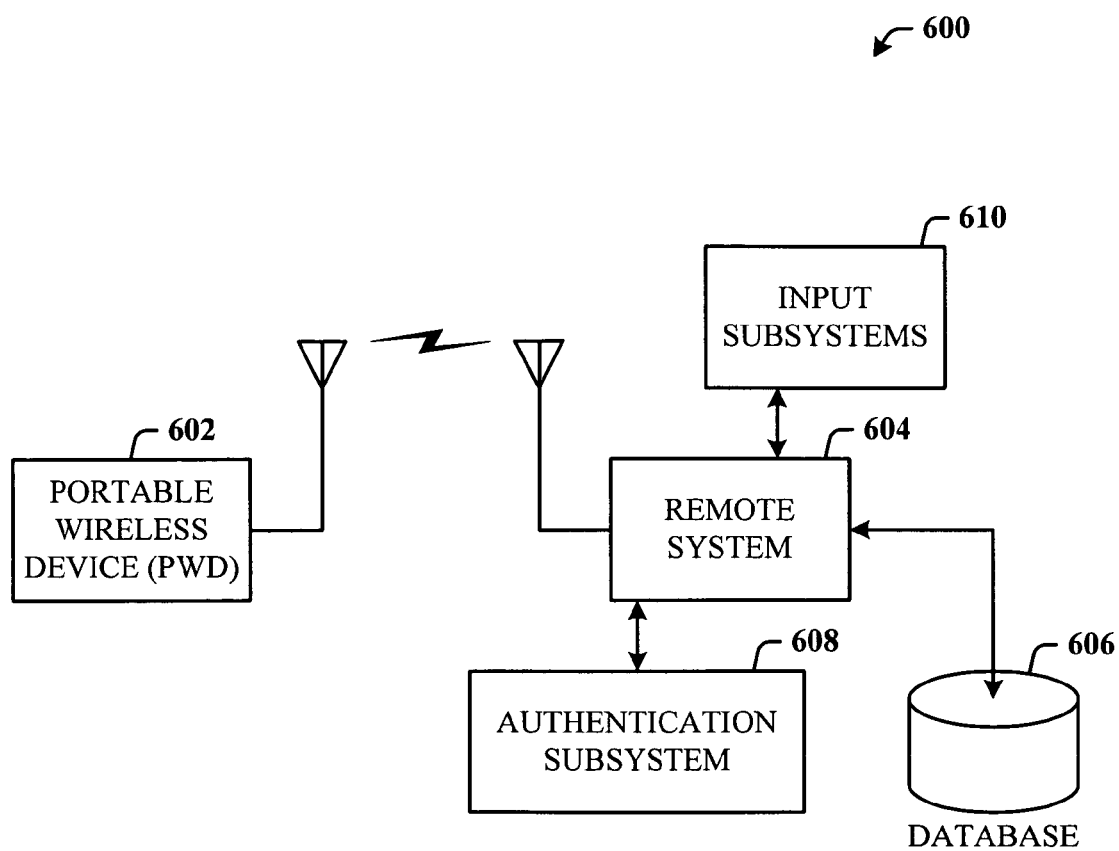
FIG. 6 illustrates an authentication system where authentication is performed between a PWD and a remote system.

FIG. 6 illustrates an authentication system 600 where authentication is performed between a PWD 602 and a remote system 604. The system 600 performs authentication wirelessly via radio communications; however, it is to be appreciated other wired and/or line-of-sight optical communications regimes can also be employed. In this scenario, the user brings the PWD 602 into communications range of the remote system 604. The PWD 602 can include user information that uniquely identifies the user and/or device. This information can be manually or automatically communicated to the remote system 604, in response to which the remote system 604 accesses a database 606 of user information in order to perform at least a preliminary check for the user information. If the user information is not available, the system can initiate a subscription process that prompts the user to facilitate the input of user information.

If the user information is available in the database 606, an authentication subsystem 608 associated with the remote system 604 can initiate user authentication. This process can involve accessing the database 606 in order to determine what authentication input subsystem(s) 610 will be employed. The input subsystem(s) 610 can include any or all of the recognition and biometrics subsystems of FIG. 4, and additional systems, as desired. These can vary for the particular application. Moreover, the input subsystem(s) are grouped as a single block; however, in practice, these subsystem(s) 610 may be separate from one another, but made accessible for interfacing by the user for authentication purposes. For example, the face recognition subsystem can include a camera system that is covertly concealed, yet a thumb printing subsystem or hand printing subsystem needs to be positioned for easy access by the user.

Once the authentication subsystem 608 receives the input subsystem(s) information, authentication begins by prompting the user to interface to the input subsystem(s) until the desired input information can be received and processed. Once authentication processing has completed, the user can then be notified directly by the remote system 604 and/or the PWD 602 of the success or failure, or indirectly by the device shutting down, for example.

Figure 7:
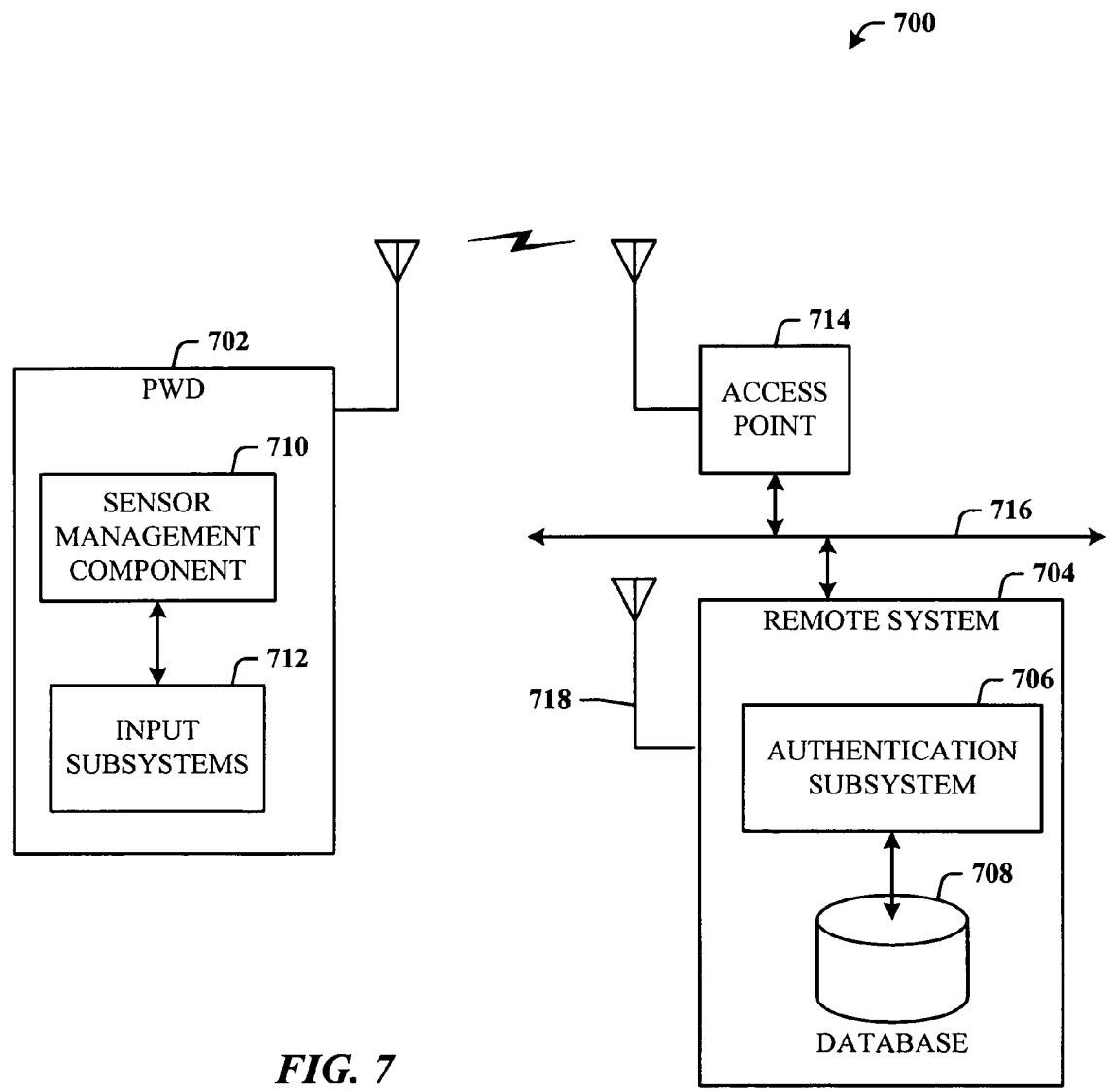
FIG. 7 illustrates an authentication system wherein a device user authenticates to a PWD via a remote system.

FIG. 7 illustrates an authentication system 700 wherein a device user authenticates to a PWD 702 via a remote system 704. Here, the remote system 704 includes an authentication subsystem 706 that receives user inputs wirelessly via user interaction with the PWD 702 and processes the user inputs against a database 708 of predetermined user profile data. The PWD 702 includes a sensor management component 710 that interfaces to input subsystems 712 of the PWD 702 which comprise at least the recognition systems and biometric system described supra.

In operation, when the user brings the PWD 702 into wireless communications range of the remote system 704, the PWD 702 automatically initiates communication therewith. The remote system 704 responds with an authentication request to the PWD 702, in response to which the PWD 702 initiates authentication of the user. Since the PWD 702 has communicated with the remote system 704, the context is known, such that the PWD 702 can select one or more of the input subsystems 712 for user authentication. Alternatively, the remote system 704 is made known of the input subsystems capabilities of the PWD 702 as part of initial communications with the remote system 704. Thereafter, the remote system 704 signals the PWD 702 for one or more modal inputs of the input subsystems 712 that will be employed during the authentication process.

Once the user has interacted with the selected input subsystems 712, the input data is processed and forwarded to the remote system 704 for authentication processing by the authentication subsystem 706 against previously-stored and predetermined user profile data in the database 708. If the input data matches the stored data, or if, in one implementation, the input data substantially agrees with the stored within a certain percentage (e.g., is in 95% agreement), then the authentication process can be deemed successful. The remote system 704 can communicate the results to the PWD 702 via a wireless access point 714 of a network 716, for example, which then enables operation of the PWD 702, and access to services disposed on the network 716. Alternatively, the PWD 702 can communicate directly with the remote system 704, where the remote system 704 includes wireless communication means 718.

Figure 8:
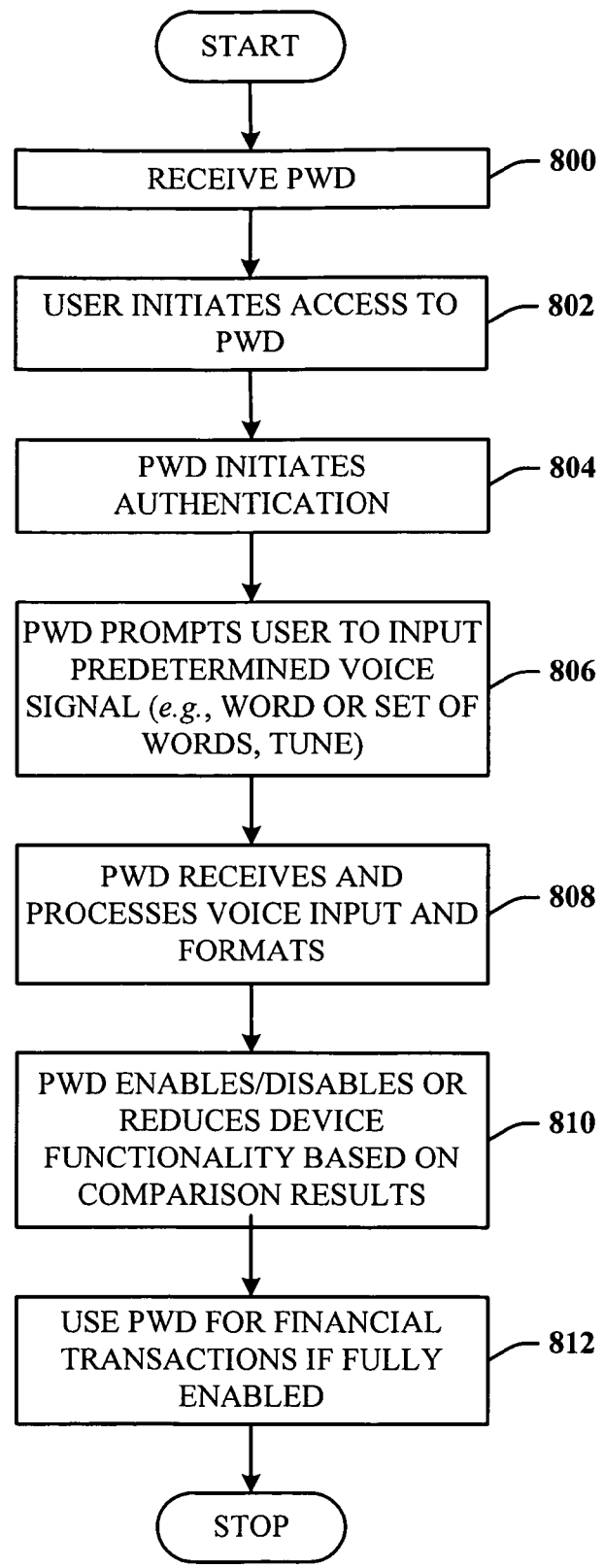
FIG. 8 illustrates a methodology of authenticating the user using speech recognition in accordance with the innovation.

FIG. 8 illustrates a methodology of authenticating the user using speech recognition in accordance with the innovation. At 800, the PWD is received. At 802, the user initiates access to the PWD. At 804, in response to attempted user access, the PWD initiates an authentication process. At 806, the PWD prompts the user to input a predetermined voice signal or signals (e.g., a word or series of words, tune, . . . ). At 808, the PWD receives the voice input, and prepares for authentication by first processing the voice input into a format that is suitable for rapid comparison. The PWD then compares the formatted voice data to the similar voice data stored on the PWD. Authentication is then completed when the comparison process has returned a result. In another implementation, authentication occurs by transmitting the formatted voice data from the PWD to a remote authentication system that returns the results.

If the results indicate that authentication is successful, the PWD can automatically enable all onboard features for user access. In another implementation, depending on the context in which the device is accessed and/or authentication occurs, a successful authentication will not enable all onboard features, but only a subset thereof, such that the PWD allows access to a reduced set of device features. At 812, in this particular application, successful authentication will allow the user to perform financial transactions such that those associated with a credit card, debit card, Internet-based account access for the electronic access and/or transfer of user funds, etc.

Figure 9:
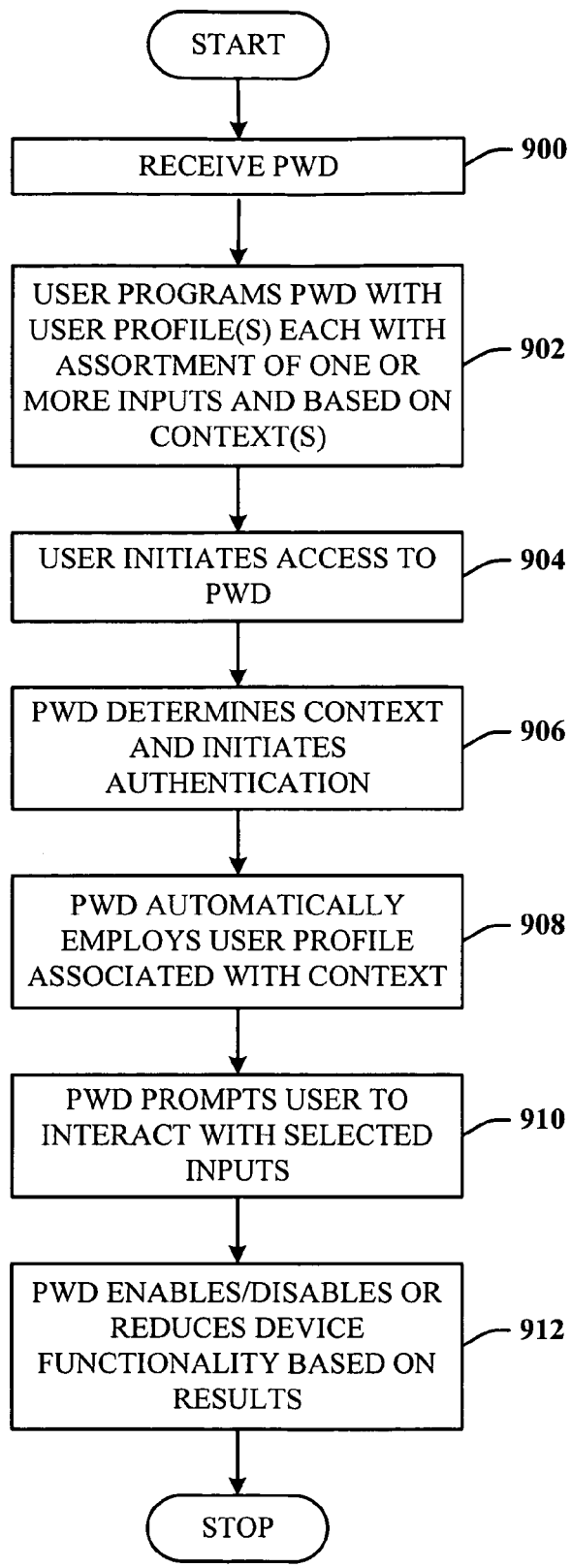
FIG. 9 illustrates a methodology of applying a user profile for multimodal authentication in an aspect of the innovation.

FIG. 9 illustrates a methodology of applying a user profile for multimodal authentication in an aspect of the innovation. At 900, the PWD is received. At 902, the user programs the PWD with one or more user profiles(s) each with an assortment of one or more authenticating inputs, and based respectively on the context in which the authentication occurs. At 904, the user initiates access to the PWD. At 906, the PWD determines the context and initiates the authentication process. At 908, the PWD automatically employs the user profile associated with the context. At 910, the PWD prompts the user to interact with the authentication inputs selected for the particular context. For example, if the context is determined to require less secure methods of authentication (e.g., no financial information exposed), then the authenticating input(s) can be less complex or those that are less computationally intense. At 912, the PWD enables, disables, or reduces device functionality based on the authentication results.

Figure 10:
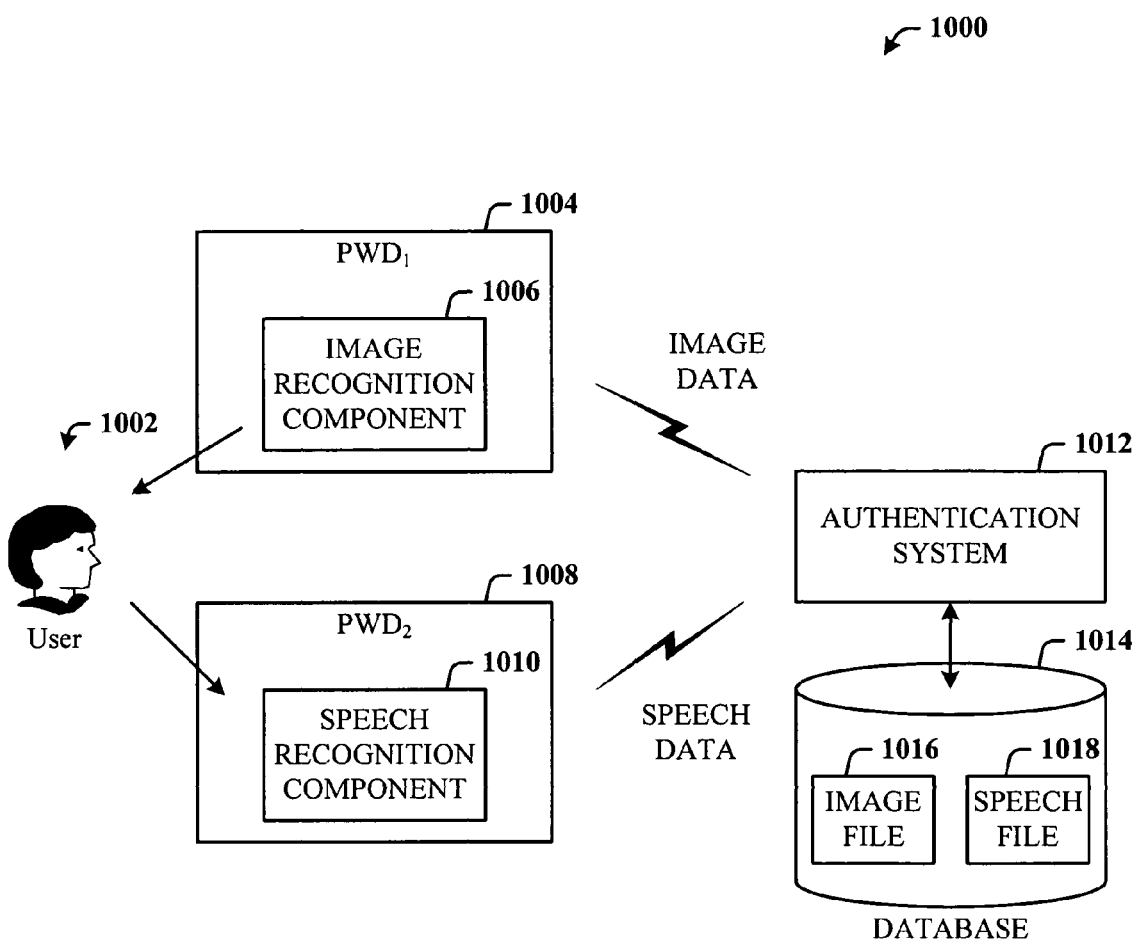
FIG. 10 illustrates a system that employs multiple different portable devices for multimodal authentication.

FIG. 10 illustrates a system 1000 that employs multiple different portable devices for multimodal authentication. In this example, a user 1002 carries two devices: a first portable wireless device 1004 (denoted $PWD_1$) that includes at least an image recognition component 1006 (e.g., a camera integral as part of image processing hardware and/or software), and a second portable wireless device 1008 (denoted $PWD_2$) that includes at least a speech recognition component 1010. The system 1000 also includes an authentication system 1012 and an authentication database 1014 which includes authentication data, for example, a corresponding image file 1016 and speech file 1018.

In one implementation, the user moves proximate to the authentication system 1012, which triggers the authentication process. If it is determined from the context that at least image recognition and speech recognition should be employed, and neither the first device 1004 nor the second device 1008 includes both authentication input systems, then both devices can collaborate to provide the desired authentication input data. Thus, the first device 1004 can be used to capture a facial image of the user 1002 for face recognition, and the second device 1008 can be used to record and process speech information. The first device 1004 will then communicate the processed image data wirelessly to the authentication system 1012, as will the second device 1008 communicate the speech data wirelessly thereto.

The authentication system 1012 receives the image and speech data, and processes the respective data against an image file 1016 and a speech file 1018. If the comparison is successful, the results are communicated back to either or both of the devices (1004 or/and 1008), which can then have features enabled for further use in accordance with the context.

In another implementation, if only one of the image data or speech data is successfully authenticated, the authentication system 1012 can request that both devices (1004 and 1008) request input again, or request only that the device associated with the failed input, recapture its input again.

Figure 11:
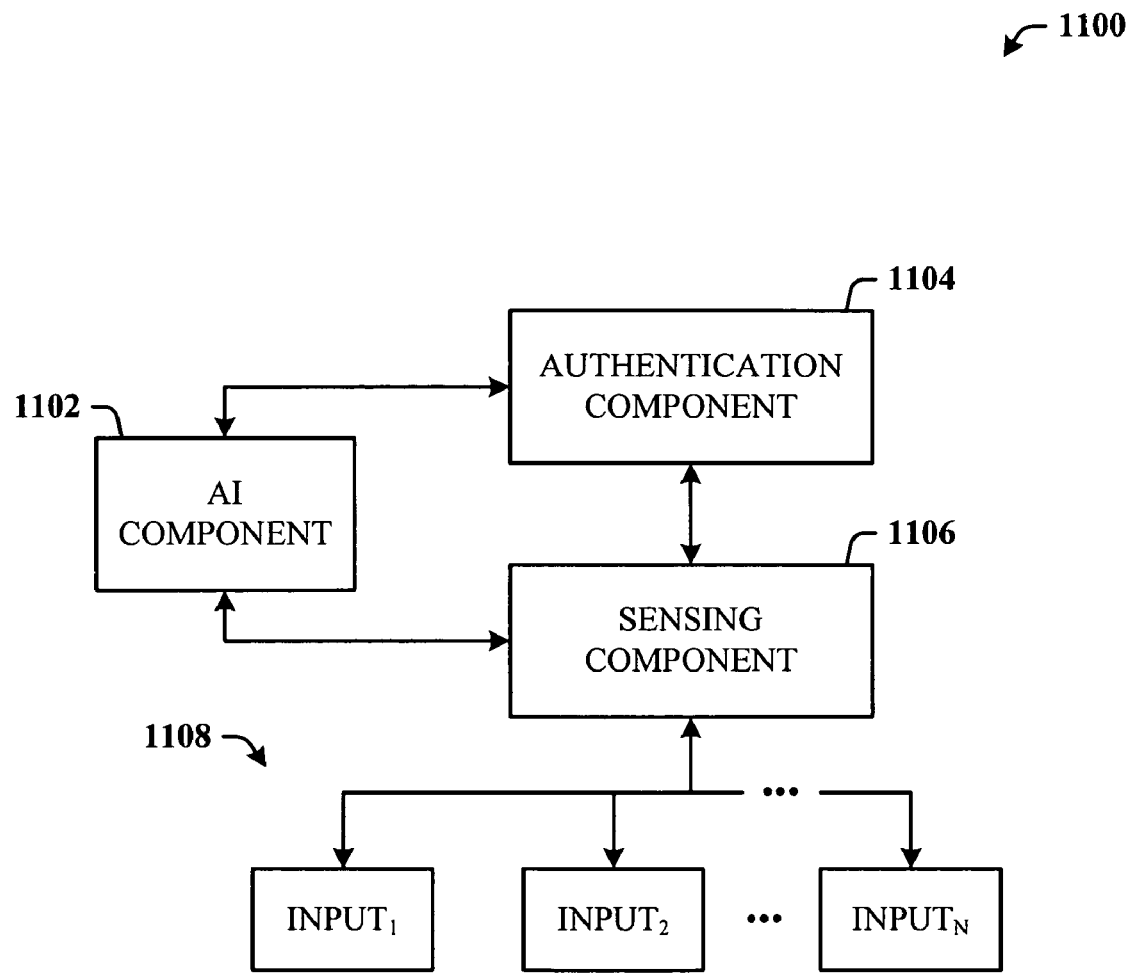
FIG. 11 illustrates a system that employs an artificial intelligence component which facilitates automating one or more features in accordance with the subject innovation.

FIG. 11 illustrates a system 1100 that employs an artificial intelligence (AI) component 1102 which facilitates automating one or more features in accordance with the subject innovation. The subject innovation (e.g., in connection with selection) can employ various AI-based schemes for carrying out various aspects thereof. For example, a process for determining what user profile to employ can be facilitated via an automatic classifier system and process. Moreover, the classifier can be employed to determine when to automatically modify a user profile when the user interacts differently with the device during the authentication process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions, including but not limited to determining according to a predetermined criteria what stored authentication files to use in testing the authentication inputs provided by the user.

For example, in system 1100 of FIG. 11, the AI component 1102 interfaces to an authentication component 1104 and a sensing component 1106. The sensing component 1106 interfaces to a plurality of different sensed inputs 1108 (denoted $INPUT_1, INPUT_2, \ldots, INPUT_N$, where N is an integer) that can be employed to increase confidence associated with the authentication process. Authentication can be improved, for example, by processing data and/or combined sets of data received from one or more of the sensed inputs 1108 substantially concurrently. Such inputs can include, by example, but not by limitation, data associated with face recognition, biometrics, speech recognition, handwriting recognition, gait recognition, retina scan processing, fingerprinting and/or handprinting, or any combination thereof.

The sensing component 1106 interfaces to the one or more inputs 1108 to receive at least input data therefrom, and process the input data for communication to an authentication component 1104. The authentication component 1104 receives the input data from the sensing component 1106 in a format that allows further authentication processing in order to determine authentication of the user.

The AI component 1102 interfaces to the sensing component 1106 to monitor input data of the one or more inputs 1108. Similarly, the AI component 1102 interfaces to the authentication component 1104 to facilitate management (monitor and control) thereof. For example, as the components (1104 and 1106) operate in response to user interactions, the AI component 1102 learns patterns of use based on any number of criteria, to include context, successes and failures of authentications, successes and failures of authentications with respect to context, user preferences for authentication, and so on.

Figure 12:
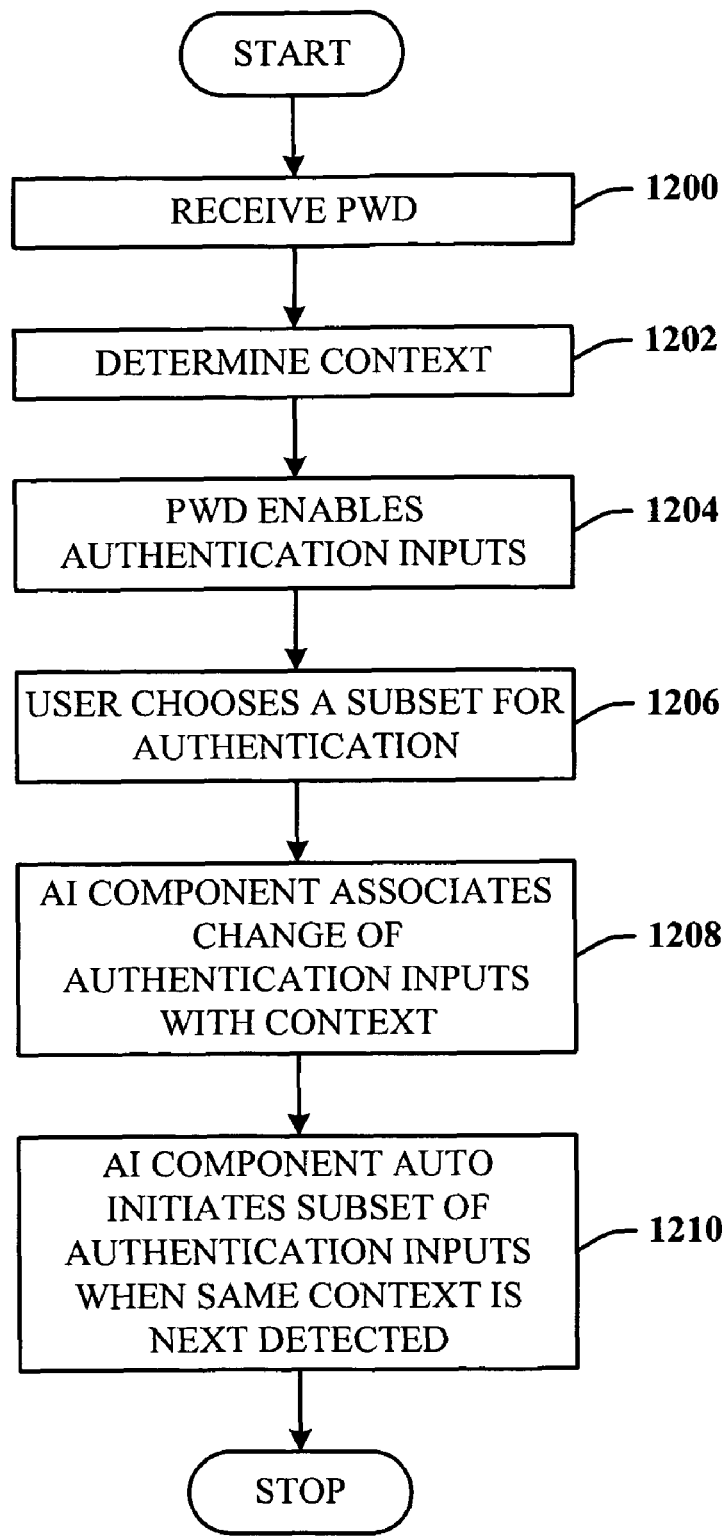
FIG. 12 illustrates a methodology of automating one or more features of a multimodal implementation in accordance with the subject innovation.

FIG. 12 illustrates a methodology of automating one or more features of a multimodal implementation in accordance with the subject innovation. At 1200, the PWD is received for use. At 1202, the user context is determined. This can be via the PWD communicating with a remote authentication system that "knows" the context, and employs one or more of the authentication inputs for the authentication process. At 1204, the PWD enables the appropriate authentication inputs. At 1206, the user chooses a subset of the inputs for authentication. At 1208, the AI component associates the change of authentication sensed inputs with the current context. At 1210, the AI component automatically associates the subset of authentication inputs with the same context when detected next time.

In another scenario, the AI component can facilitate overriding a default set of authentication inputs where totality of the circumstances indicates as such. For example, if the remote authentication system indicates that a number of previous authentications by a particular user/device have resulted in excessive or highly suspect transactions, the AI component can automatically enable additional sensed inputs periodically to ensure that the current user/device is valid.

Figure 13:
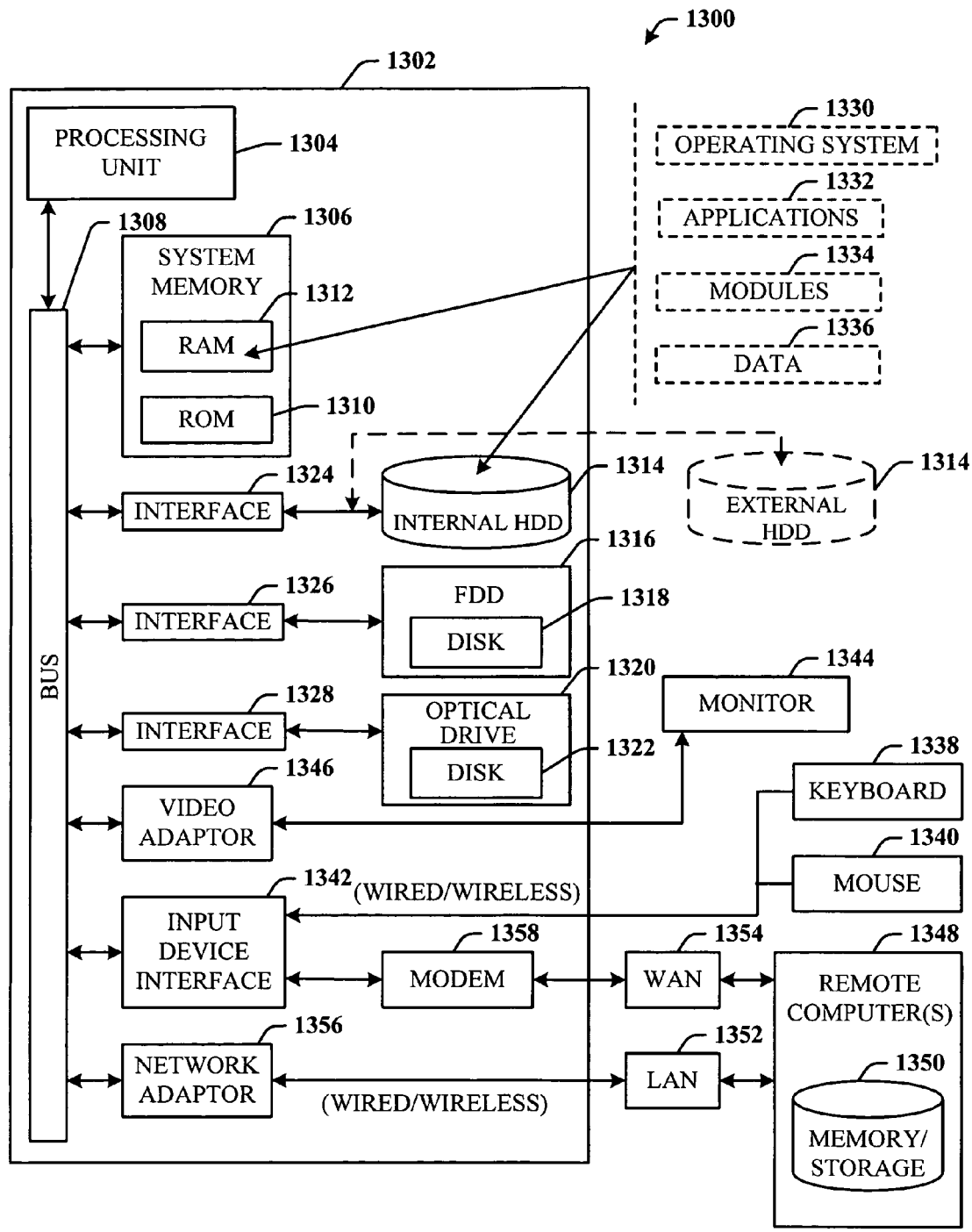
FIG. 13 illustrates a block diagram of a computer operable to execute authentication according to the disclosed architecture.

Referring now to FIG. 13, there is illustrated a block diagram of a computer operable to execute authentication according to the disclosed architecture. In order to provide additional context for various aspects thereof, FIG. 13 and the following discussion are intended to provide a brief, general description of a suitable computing environment 1300 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching authentication data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored on the drives and in the RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adaptor 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station or access point. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 14:
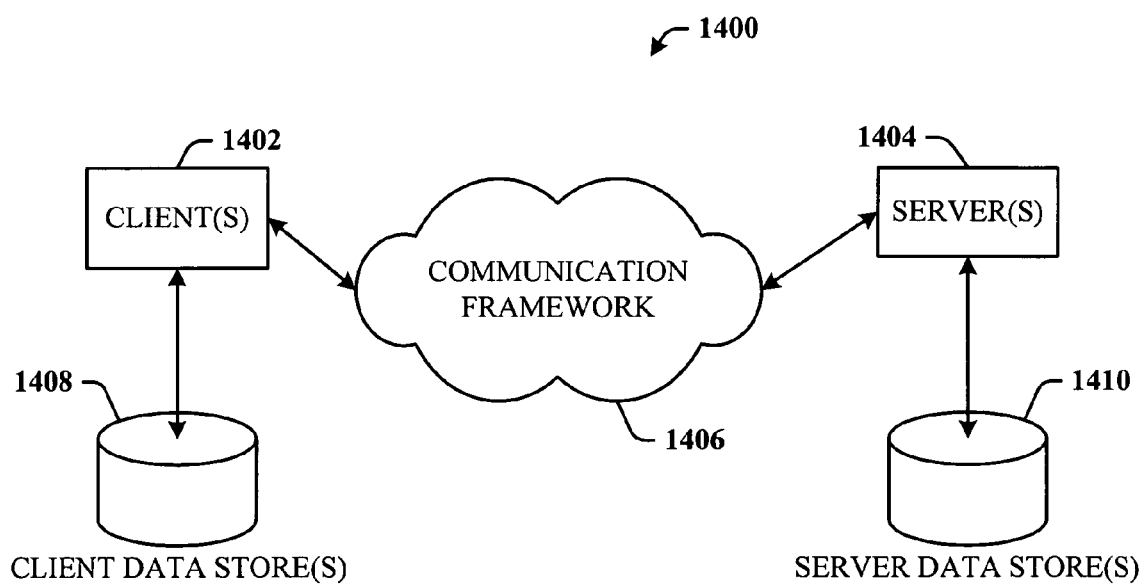
FIG. 14 illustrates a schematic block diagram of an exemplary computing environment that facilitates wired and wireless multimodal authentication in accordance with another aspect.

Referring now to FIG. 14, there is illustrated a schematic block diagram of an exemplary computing environment 1400 that facilitates wired and/or wireless multimodal authentication in accordance with another aspect. The system 1400 includes one or more client(s) 1402 that can be wireless clients of the portable wireless device described supra. The client(s) 1402 can be hardware and/or software (e.g., threads, processes, computing devices). The client(s) 1402 can house cookie(s) and/or associated contextual information by employing the subject innovation, for example.

The system 1400 also includes one or more server(s) 1404. The server(s) 1404 can also be hardware and/or software (e.g., threads, processes, computing devices). The servers 1404 can house threads to perform transformations by employing the invention, for example, with respect to authentication processes. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store authentication information local to the servers 1404.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates authentication, the system comprising:
    a processor;
    memory communicatively coupled to the processor, the memory having stored therein computer-executable instructions to implement the system, including:
        a sensing component that concurrently receives a plurality of sensed inputs and outputs sensing data, wherein the sensed inputs include a current context of data access and at least one authentication input for authentication;
        an artificial intelligence component that uses a pattern matching classifier to select the use of a plurality of authentication input subsystems based on the current context, and receives user preference for using at least one of the plurality of authentication input subsystems for authentication, wherein the artificial intelligence component selects the use of the at least one different authentication input subsystem for authentication by employing the pattern matching classifier to perform at least one of probabilistic or statistical-based inference analysis of one or more contexts sensed by the sensing component that are different from the current context; and
        an authentication component that performs an authentication process employing the sensing data, and determines whether to enable access to a full set of device features or a subset of the device features based on the current context of data access when the sensing data has resulted in successful authentication.

2. The system of claim 1, wherein the pattern matching classifier includes a support vector machine (SVM) classifier or a naïve Bayes classifier.

3. The system of claim 1, wherein the sensing component outputs at least one of speech recognition related information, face recognition related information, handwriting recognition related information, or gait recognition related information.

4. The system of claim 1, wherein the sensing component outputs at least one of a retinal scan related information or handprint related information.

5. The system of claim 1, wherein the sensing component outputs biometric related data.

6. The system of claim 1, wherein the authentication component authenticates a user to a portable wireless device.

7. The system of claim 1, wherein the authentication component authenticates a portable wireless device to a remote system.

8. The system of claim 1, wherein the plurality of authentication input subsystems includes two or more of a face recognition component, a speech recognition component, retinal scan component, a handwriting recognition component, a gait recognition component, a handprint recognition component, or a fingerprint recognition component.

9. The system of claim 1, wherein the authentication component provides an indication to the artificial intelligence component that one or more suspect transactions have been detected from the user, the artificial intelligence component based upon the received indication enables use of one or more additional authentication inputs for authentication of the user.

10. A portable wireless device that employs the system of claim 1, wherein the sensed inputs include at least two biometric inputs from a user, at least one of the biometric inputs is detected from a sensor that is integrated into the portable wireless device, at least one of the biometric inputs is detected from an external device that is not physically connected to the portable wireless device, the authentication component employs sensing data associated with the at least two biometric inputs to authenticate the user.

11. A method of authenticating an entity, the method comprising:
    employing a processor executing computer executable instructions to perform the following acts:
        creating a plurality of user profiles, wherein at least two user profiles are associated with a user, each of the at least two user profiles are associated with one of a plurality of user authentication contexts, each of the at least two user profiles has one or more user selected inputs for authentication based on the authentication context associated with the user profile;
        selecting inputs associated with a user profile using a classifier that employs at least one of probabilistic or statistical-based inference analysis of the authentication context;
        receiving sensed input data from the automatically selected inputs based on user interaction with the automatically selected inputs;
        processing the sensed input data to output data for authentication processing;
        comparing the output data with predetermined user authentication data;
        granting user access to data when the output data agrees with the predetermined user authentication data to a predetermined percentage and
        adjusting a level of authentication processing to a higher level based on detection of one or more suspect transactions from the user, and automatically selecting one or more additional inputs for authentication based on the higher level.

12. The method of claim 11, further comprising transmitting the output data to a remote location for the authentication processing.

13. The method of claim 11, further comprising reducing the user access when the output data does not agree with the user predetermined user authentication data to a predetermined percentage.

14. The method of claim 11, wherein the controlling user access includes one of enabling a device functionality, disabling the device functionally, or reducing the device functionality.

15. The method of claim 11, wherein the level of authentication processing is a higher level that employs additional authentication inputs for the authentication processing than the automatically selected inputs associated with the user profile.

16. The method of claim 11, wherein the level of authentication processing is a higher level that employs a more reliable authentication input for the authentication processing than the automatically selected inputs associated with the user profile.

17. The method of claim 11, further comprising, upon the user choosing one or more inputs in the authentication context that are changed from the user selected inputs associated with the authentication context, associating the one or more changed user chosen inputs with the user profile associated with the authentication context.

18. The method of claim 11, further comprising performing at least one of the following as one of the selected inputs: face recognition, speech recognition, gait recognition, handwriting recognition, retinal scan recognition, biometric recognition, or handprint recognition.

19. A system that facilitates authentication of an entity, comprising:
a processor;
memory communicatively coupled to the processor, the memory having stored therein computer-executable instructions performing acts comprising:
sensing a plurality of authentication input subsystems for user authentication;
identifying a current context associated with the authentication, the current context including a type of stored data protected by the authentication;
determining a plurality of distinct biometric inputs required for authentication in the current context;
identifying at least two authentication input subsystems from the plurality of authentication input subsystems that in combination have capability to receive the plurality of the distinct biometric inputs, the at least two authentication input subsystems being identified by a pattern matching classifier that performs at least one of probabilistic or statistical-based inference analysis of the current context associated with the authentication;
receiving the plurality of distinctive biometric inputs via the at least two authentication input subsystems;
processing the sensed multiple distinct biometric inputs concurrently and outputting authentication data;
comparing the authentication data with predetermined authentication data and generating authentication results;
controlling access based on the authentication results; and
requesting one or more additional requested biometric inputs on a periodic basis when the plurality of distinctive biometric inputs results in excessive transactions during permitted access.

20. The system of claim 19, wherein the biometric include physical characteristics of a user as measured and processed into the authentication data, at least one of the physical characteristics includes a facial feature, a voice characteristic, a finger feature, a hand feature, or an eye feature.

* * * * *